United States Patent [19]
Porter

[11] Patent Number: 5,615,829
[45] Date of Patent: Apr. 1, 1997

[54] AIR CONDITIONING SYSTEM THERMOSTAT HAVING ADJUSTABLE CYCLING RATE

[75] Inventor: Richard B. Porter, Bloomington, Minn.

[73] Assignee: Honeywell Inc., Minneapolis, Minn.

[21] Appl. No.: 471,722

[22] Filed: Jun. 6, 1995

[51] Int. Cl.⁶ .................................. G05D 23/32
[52] U.S. Cl. .......................... 236/68 B; 337/103
[58] Field of Search ................ 62/202; 236/68 R, 236/68 B, 68 C, 10, 46 R, 46 F, 78 D; 337/103

[56] References Cited

U.S. PATENT DOCUMENTS

| | | | |
|---|---|---|---|
| 1,741,601 | 12/1929 | Appelberg | 236/68 B |
| 2,092,327 | 9/1937 | Persons | 337/103 |
| 2,209,768 | 7/1940 | Dillman | 236/68 B X |
| 2,489,049 | 11/1949 | Root | 236/68 B X |
| 2,628,034 | 2/1953 | Ray | 236/68 B |
| 2,649,530 | 8/1953 | Dietz | 236/68 B X |
| 2,732,132 | 1/1956 | Hulett | 236/68 B X |
| 2,905,790 | 9/1959 | Markham | 337/103 |
| 2,978,228 | 4/1961 | Carlson | 236/68 B X |
| 3,111,010 | 11/1963 | Spofford | 236/68 B |
| 3,147,354 | 9/1964 | Hewitt, Jr. | 337/103 |
| 3,154,654 | 10/1964 | Woods et al. | 337/103 X |
| 3,249,721 | 5/1966 | Baak | 337/103 X |
| 3,948,438 | 4/1976 | Vlasak | 236/9 A |
| 4,485,966 | 12/1984 | Cartmell | 236/46 R |
| 4,489,882 | 12/1984 | Rodgers | 236/78 D |
| 4,759,498 | 7/1988 | Levine | 236/46 R |
| 4,817,705 | 4/1989 | Levine | 165/12 |
| 4,901,918 | 2/1990 | Grald | 236/78 D |
| 5,002,226 | 3/1991 | Nelson | 236/78 R |
| 5,039,010 | 8/1991 | Juntunen | 236/78 C |
| 5,115,968 | 5/1992 | Grald | 236/78 D |

*Primary Examiner*—Harry B. Tanner
*Attorney, Agent, or Firm*—Edward L. Schwarz

[57] ABSTRACT

A thermostat for controlling an air conditioning system has a selectable cycling rate. A manually variable resistor element is connected in parallel with the thermostat's standard anticipator resistor. In a preferred embodiment, the manually variable resistor element comprises a series circuit formed from a manually operable switch in series connection with a cycling modifier anticipator resistor is connected across the power terminals of the thermostat. By closing the switch, additional heat is supplied to the thermostat's temperature sensing element during the times when the thermostat is not providing power to the air conditioning system. The additional heat causes the thermostat to cycle the air conditioning unit more rapidly.

5 Claims, 1 Drawing Sheet

AIR CONDITIONING SYSTEM THERMOSTAT HAVING ADJUSTABLE CYCLING RATE

BACKGROUND OF THE INVENTION

As with thermostats for controlling heating systems, thermostats for controlling air conditioning systems have anticipator resistors to improve the stability of the temperature in the controlled space. In air conditioning mode thermostats, the anticipator resistor is connected across the power terminals, so that current flows through it when power is not provided to the air conditioning system. Thus, between on times of the air conditioning, the anticipator resistor slowly heats the air within the thermostat housing causing power to be again applied to the air conditioning system earlier than it would otherwise occur. Since the temperature within the thermostat housing typically lags the space temperature, the anticipator resistor if chosen properly and located within the housing properly, will result in the controlled space temperature to hold closely to the selected temperature setting of the thermostat.

One factor which contributes to the energy efficiency of the air conditioning operation, to the operating life of the air conditioning system, and to the accurate control of the temperature and humidity within the controlled space, is the cycles for the air conditioning system per hour. If the cycling rate is too high, the air conditioning system starts and stops too frequently, which can cause excess wear on the system, and because of the high energy draw and relatively small cooling output associated with the first few minutes of air conditioning system operation, lower energy efficiency. It is customary to select the characteristics of the anticipator resistor, the thermostat's temperature sensing element, and thermostat housing to cause the cycling rate to have some nominal value, one cycle per hour (CPH) being typical.

Air conditioning systems have a variety of designs and efficiencies and controlled spaces have their own thermal characteristics. Because of this, I have found that no one cycling rate is suitable for every installation. Accordingly, it is desirable to provide for adjustment of the cycling rate. At the same time, the adjustment for cycling should ideally be easy for the installer to set initially, and after installation should be difficult for the user to inadvertently change.

I presently have pending U.S. patent application Ser. No. 08/261,369 entitled Thermostat With Adjustment for the Cycling Rate of the Heating Plant, and filed on Jun. 16, 1994, and assigned to the assignee of the present application. In this previous application, I describe and claim a heating control thermostat which allows the installer or user to adjust the cycling rate for the furnace supplying the heat to the controlled space by changing the value of a second anticipator resistor. This previous application describes an invention which is similar in theory to the present application, but which requires different circuit connections. Both that invention and this one allow the installer or user to alter the cycling rate of the temperature control apparatus by simply changing a resistance value in the thermostat circuit.

BRIEF DESCRIPTION OF THE INVENTION

My invention comprises an improvement to a thermostat controlling the operation of an air conditioning system. A thermostat generally has a housing in which is mounted a temperature sensing element, a power switch controlled by said temperature sensing element and having first and second terminals for controlling flow of power to an air conditioning system, and a first anticipator resistor connected between the first and second power switch terminals and proximate to the temperature sensing element. My improvement allows adjustment of the thermostat to alter the cycling rate of the air conditioning system. In its broadest form my invention comprises a manually adjustable resistance means proximate to the temperature sensing element and having a first terminal connected to the first power switch terminal and a second terminal connected to the second power switch terminal, for providing a manually adjustable amount of resistance across the power switch. By adjusting the resistance of the manually adjustable resistance means, the amount of heat supplied to the temperature sensing element can be altered, and the cycling rate thereby altered.

In one preferred embodiment, the manually adjustable resistance means comprises a cycling resistor proximate to the temperature sensing element and having a first terminal connected to the first terminal of the power switch and a second terminal connected to a first terminal of a manually operable switch. The manually operable switch has a second terminal connected to the second terminal of the power switch. When the manually operable switch is closed, the cycling resistor is placed in parallel connection with the anticipator resistor, providing additional heat within the thermostat enclosure while the thermostat is not calling for cooling. The additional heat causes the temperature sensing element to warm more rapidly when the power switch is not closed, which increases the number of cooling cycles during a given time interval. Removing the cycling resistor from the circuit reduces the amount of heat provided to the temperature sensing element, reducing the cycling rate.

DESCRIPTION OF THE PREFERRED EMBODIMENT

Figure 1:
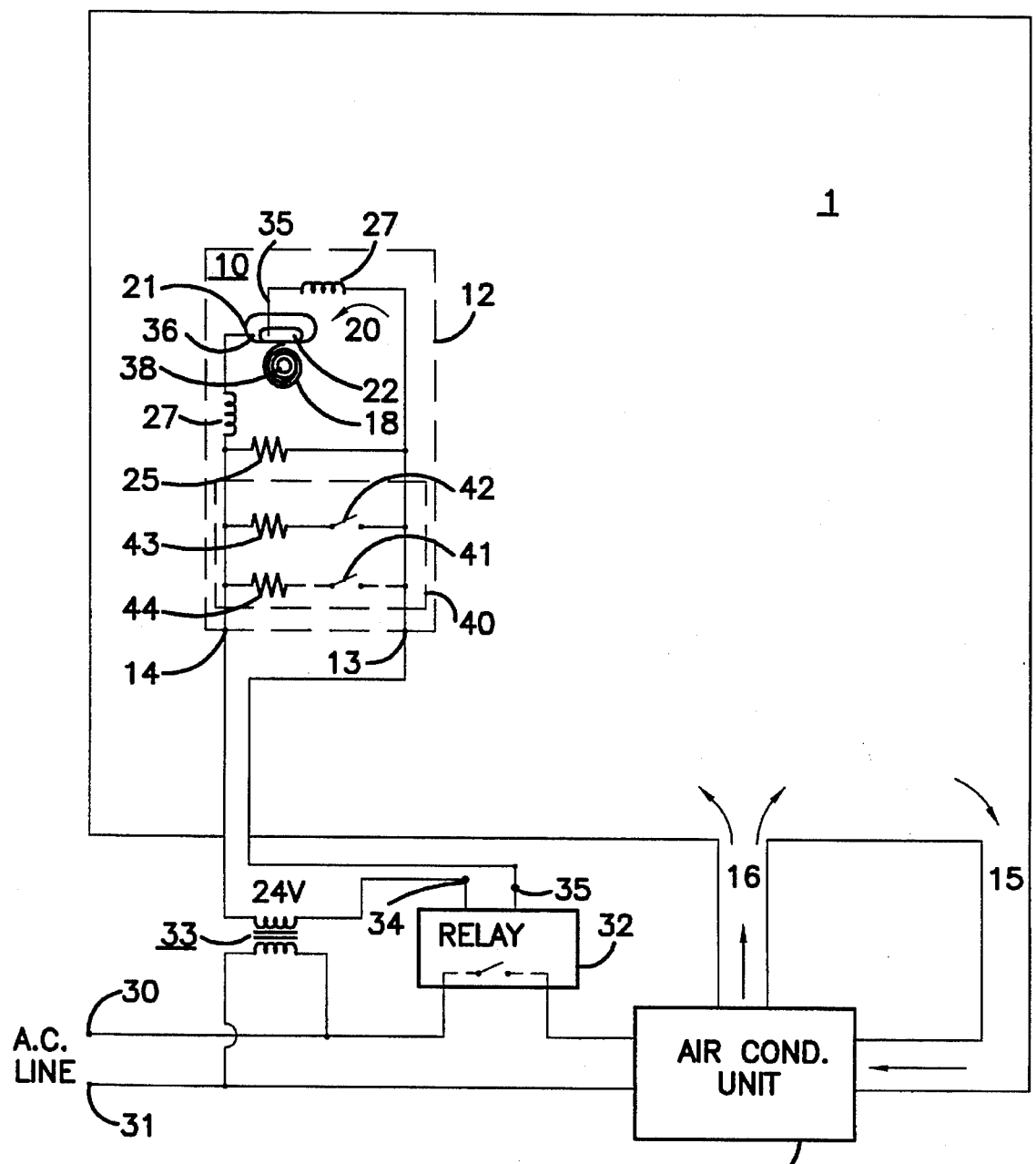
FIG. 1 is a diagram of a circuit incorporating the invention.

Turning to FIG. 1, therein is shown an outline of a cooled or temperature controlled space 1. An air conditioning unit 17 receives air from cooled space 1 via inlet air duct 15, where the arrow indicates air stream movement. Air conditioning unit 17 cools and dehumidifies air received from space 1 and returns this air to space 1 via duct and outlet 16, usually adding cooled and dehumidified external air to the returned air. The entire air conditioning system including unit 17 receives electrical power from AC line terminals 30 and 31.

Power from power terminals 30 and 31 to air conditioning unit 17 itself is switched by an air conditioning unit relay 32 having control terminals 34 and 35. A transformer 33 reduces the line voltage at terminals 30 and 31 to 24 v. AC used for controlling the operation of air conditioning unit 17. When 24 v. AC from a transformer 33 is applied to terminals 34 and 35, relay power contacts shown in dotted outline close and apply power to air conditioning unit 17.

A thermostat 10, a feature of which comprises the invention, is mounted within space 1 and controls flow of current from transformer 33 to control terminals 34 and 35. Thermostat 10 is shown in a combined circuit and mechanical diagram form so as to illustrate the features of the invention. Thermostat 10 includes a base 12 shown in dotted outline form on which the components of thermostat 10 are mounted. A cover, not shown, is invariably attached to the base 12 to enclose the thermostat components. Such a cover should be vented to allow air from space 1 to circulate within the internal volume of the thermostat. Where air conditioning of space 1 occurs, it goes without saying that the air temperature within space 1 tends to rise to a level above that which is comfortable for occupants, due to heat supplied from internal or external sources.

Thermostat 10 as designed for cooling control will cause electrical connection between terminals 13 and 14 when temperature within the controlled space rises to above a user selectable value. Conventionally, the switching function within thermostat 10 is done by a mercury power switch 20 comprising a glass capsule 21 with an internal mercury ball 22 to electrically connect a first internal contact 35 to a second internal contact 36 when capsule 21 is tilted so as to cause mercury ball 22 to roll to the left within capsule 21. Capsule 21 is mounted on the exterior end of a bimetal coil 18 whose interior end is fixed to a rotatable hub 38. Contacts 35 and 36 are connected to thermostat terminals 13 and 14. A flexible pigtail 27 is placed in the connection between contact 35 and terminal 13 and contact 36 and terminal 14.

Altering the angular position of hub 38 changes the temperature setting for thermostat 10 by changing the angular orientation of bimetal coil 18. Should the temperature in the vicinity of bimetal coil 18 rise, coil 18 temperature increases as well by conductive and convective heat transfer. Increased coil 18 temperature causes coil 18 to unwind and its outer end to tilt capsule 21 so that its left end falls with respect to its right end. Mercury ball 22 responds by rolling to the left and completing an electrical circuit between contacts 35 and 36. There is a temperature differential which is inherent in switch 20. That is, once capsule 21 has tilted to close switch 20, a temperature change of typically two to three degrees F. as sensed by bimetal coil 18 is required to tilt capsule 21 sufficiently to again open switch 20. Pigtails 27 reduce the torque which the connections between contacts 35 and 36 and terminals 13 and 14 apply to bimetal coil 18.

Conduction between contacts 35 and 36 allows current to flow from transformer 33 to the control terminals 34 and 35 of relay 32 causing the internal relay contacts to close, and power to flow to air conditioning unit 17 itself. Of course, while air conditioning unit 17 operates, the temperature within the controlled space falls, with the result that bimetal coil 18 cools slowly. After a time, coil 18 cools to an extent allowing mercury ball 22 to roll rightward to the position shown in FIG. 1, removing power from relay control terminals 34 and 35. In this way, thermostat 10 functions as the sensor element in a closed loop control system to operate the air conditioning unit 17 for sufficient periods to hold the temperature of the controlled space 1 within a desired range.

It has been found, however, that for a variety of reasons the ability of an air conditioning unit to begin to cool the controlled space lags several minutes behind the actual time when the air conditioning unit first receives power. During this time the temperature of the controlled space 1 continues to rise perhaps to an uncomfortable level, before air conditioning unit 17 can supply adequate cooled air to the controlled space to cause the temperature to begin to fall.

In order to compensate for this temperature undershoot caused by temperature sensing lag, it is customary to include an anticipator resistor 25 within a thermostat 10. Resistor 25 is connected in parallel with switch 20, so that when switch 20 is open and not conducting, resistor 25 conducts power which flows through relay winding 32. The value of resistor 25 is chosen so that the amount of current flowing to relay winding 32 when switch 20 is open is insufficient to cause the relay's power contacts to close. Typically resistor 25 is chosen to have a value in the range of about 3000 to 4000 Ohms. Resistor 25 is located adjacent to bimetal coil 18 so that heat which resistor 25 produces is sensed by bimetal coil 18.

If one considers such a thermostat 10, one can see that while switch 20 is open, heat is supplied to bimetal coil 18 by resistor 25. This causes switch 20 to close more rapidly than if resistor 25 were not present, thereby compensating for lag in the start of cooling for the controlled space. The actual physical or mechanical layout of a thermostat 10 so as to provide a proper amount of cooling anticipation is a matter of significant empirical study.

If there is insufficient anticipation heat, then there is excessive overshoot of controlled space temperature. If there is excessive anticipation heat, then the air conditioning unit cycles excessively, which results in inefficient operation. For typical energy efficient controlled spaces and standard air conditioning units, and assuming that the unit is correctly sized for the cooling load which the controlled space presents, a well designed thermostat will cause the air conditioning unit to cycle about once per hour.

On the other hand, for certain types of air conditioning units and controlled spaces it may be desirable to use a more rapid cycling rate. I have discovered a relatively simple way to incorporate this feature in already existing cooling thermostat designs, without having to extensively redesign the unit. In my design, I place in parallel with the standard anticipator resistor 25, a manually adjustable resistance circuit 40 comprising one or more resistance elements arranged so that the resistance of circuit 40 can be manually altered by the user or system installer. It is of course basic electrical theory that the rate of heat produced within a variable resistor by a fixed voltage source varies as the inverse of the resistor value. (Precisely power $P=V^2/R$, where V is applied voltage and R is the resistance.) Thus, when the resistance of circuit 40 is relatively low, the rate of heat produced when switch 20 is open, is relatively large. When the resistance of circuit 40 is relatively high, the heat produced when switch 20 is open is relatively small, and of course when the resistance of circuit 20 is infinite, no heat at all is produced by it.

There are several configurations which are possible for circuit 40. FIG. 1 shows circuit 40 as comprising a first cycling resistor 43 in series with a first manually operable switch 42. The first cycling resistor 28 should be placed proximate to bimetal coil 18 so as to allow heat produced by resistor 28 to warm bimetal coil 18. With switch 42 closed, current flows through both resistor 43 and the standard anticipator resistor 25 when power switch 20 is open. The current flow through resistor 43 provides additional heat to bimetal coil 18. This additional heat causes the temperature of bimetal coil 18 to rise more rapidly than would happen if heat from resistor 43 were not generated. Accordingly, capsule 21 rotates counterclockwise more rapidly when switch 20 is open, and the interval between switch 20 opening and closing is shorter than it would be if switch 30 were open. Therefore, the controlled space temperature has less time to rise, with the result that the temperature control band or differential is smaller. By properly selecting the value of resistor 43, it is possible to increase the cycling rate substantially, to perhaps 2 or 3 cycles per hour. A value for resistor 43 approximately one to one and one-half times that of resistor 25 is believed to be appropriate to cause such an increase in cycling rate for a typical thermostat design. For the stated 3000 to 4000 ohm cooling anticipator resistor 25 value, this means that resistor 43 should have a value in the range of 3000 to 4000 ohms.

More control of cycling rate is possible for a manually adjustable resistance circuit 40 having more than two different resistance settings. FIG. 1 shows a series circuit comprised of second manually operable switch 41 and second cycling resistor 44 forming a part of circuit 40. The dotted line conductors to resistor 44 and switch 41 indicate the optional or alternative status of this second series circuit. Second cycling resistor 43 of course must be mounted so that heat generated by current flow through it can warm bimetal strip 18. When the second cycling resistor 44 and switch 41 is present, either or both of the manually operable switches 42 and 41 may be closed. By choosing different conductive states of switches 42 and 41 it is possible to select four different cycle rates for a particular thermostat which should be more than enough for most situations. The resistance of the two cycling resistors 43 and 44 can also be selected to provide the desired cycle rate for a given combination of switch conduction states.

Figure 2:
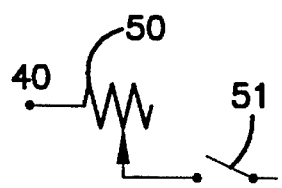
FIG. 2 is an alternative design for the manually adjustable resistance means of FIG. 1.

FIG. 2 shows yet another embodiment for circuit 40, where a variable resistor 50 and a switch 51 may be present. Switch 51 may even be optional.

I claim:

1. In an air conditioning system thermostat of the type having a housing in which is mounted a temperature sensing element, a power switch controlled by said temperature sensing element and having first and second terminals for controlling flow of power to an air conditioning system, and an anticipator resistor connected between the first and second power switch terminals and proximate to the temperature sensing element, the improvement comprising a) a first cycling resistor having a first terminal connected to the first terminal of the power switch and having a second terminal, said first cycling resistor physically located proximate to the temperature sensing element; and b) a first manually operable switch having closed and open settings, and having a first terminal connected to the second terminal of the first cycling resistor, and a second terminal connected to the second power switch terminal, for providing a manually alterable amount of resistance across the power switch dependent on the setting of the manually operable switch, whereby changing the setting of the first manually operable switch alters the amount of heat provided to the temperature sensing element, thereby changing the number of cooling cycles during a given time interval.

2. The thermostat of claim 1 further comprising:

a) a second cycling resistor having a first terminal connected to one of the power switch's first and second terminals, and having a second terminal, and b) a second manually operable switch having closed and open settings and having a first terminal connected to the second terminal of the second cycling resistor, and a second terminal connected to the other terminal of the power switch's first and second terminals.

3. The thermostat of claim 2, wherein the second cycling resistor has a value in the range of approximately 3000 to 6000 ohms.

4. The thermostat of claim 1, wherein the resistance of the first cycling resistor ranges from approximately one to one and one-half times the resistance of the anticipation resistor.

5. The thermostat of claim 4, wherein the first cycling resistor has a value of approximately 3000 to 6000 ohms.

* * * * *